United States Patent [19]
Hebisch et al.

[11] Patent Number: 5,463,169
[45] Date of Patent: Oct. 31, 1995

[54] PROCESS FOR DESTROYING PYROTECHNIC MATERIAL

[75] Inventors: Heinz Hebisch, Angermünde; Hans-Heinrich Brehmer, Gellmersdorf; Norbert Goltz; Uwe Rothenstein, both of Schwedt, all of Germany

[73] Assignee: Buck Werke GmbH & Co., Bad Überkingen, Germany

[21] Appl. No.: 83,375

[22] Filed: Jun. 28, 1993

[30] Foreign Application Priority Data

Jun. 29, 1992 [DE] Germany .............. 42 21 344.4

[51] Int. Cl.⁶ .................................................. C06D 5/06
[52] U.S. Cl. ..................... 588/202; 423/659; 149/108.4; 149/124; 588/200
[58] Field of Search ................. 149/108.4, 124; 588/202, 203, 261, 900, 200; 423/531, 659, DIG. 20

[56] References Cited

U.S. PATENT DOCUMENTS

| | | | |
|---|---|---|---|
| 3,848,548 | 11/1974 | Bolejack, Jr. et al. | 588/203 |
| 4,081,285 | 3/1978 | Pennell | 106/103 |
| 4,163,682 | 8/1979 | Montgomery et al. | 588/203 |
| 4,236,464 | 12/1980 | Anderson et al. | 588/900 |
| 4,475,466 | 10/1984 | Gravely | 588/900 |
| 4,751,887 | 6/1988 | Terry et al. | 588/900 |
| 4,949,641 | 8/1990 | Sayles | 149/214 |
| 5,264,657 | 11/1993 | Kreft et al. | 588/900 |

FOREIGN PATENT DOCUMENTS

| | | | |
|---|---|---|---|
| 4106615 | 10/1991 | Germany | A62D 3/100 |
| 4037919 | 5/1992 | Germany | F24D 5/04 |

*Primary Examiner*—Gary P. Straub
*Assistant Examiner*—Stuart L. Hendrickson
*Attorney, Agent, or Firm*—Darby & Darby

[57] ABSTRACT

In order to work up pyrotechnial material, I. pyrotechnical material A, where predominantly alkaline reaction products are formed, and pyrotechnical material B, where predominantly acidic reaction products are formed, are subjected to controlled combustion, II. the combined crude gases are cooled to a temperature below 400° C, III. the combined crude gases are purified under dry conditions by first feeding them into a preliminary separator, coarse particles being separated off, and then feeding the crude gas via fine dust filters in order to separate off finely divided solids, and/or IV. the crude gas is optionally purified under wet conditions by first passing it through a rotary scrubber and then passing it via one or more absorption unit(s), and V. the pure gas is released as waste air.

15 Claims, 1 Drawing Sheet

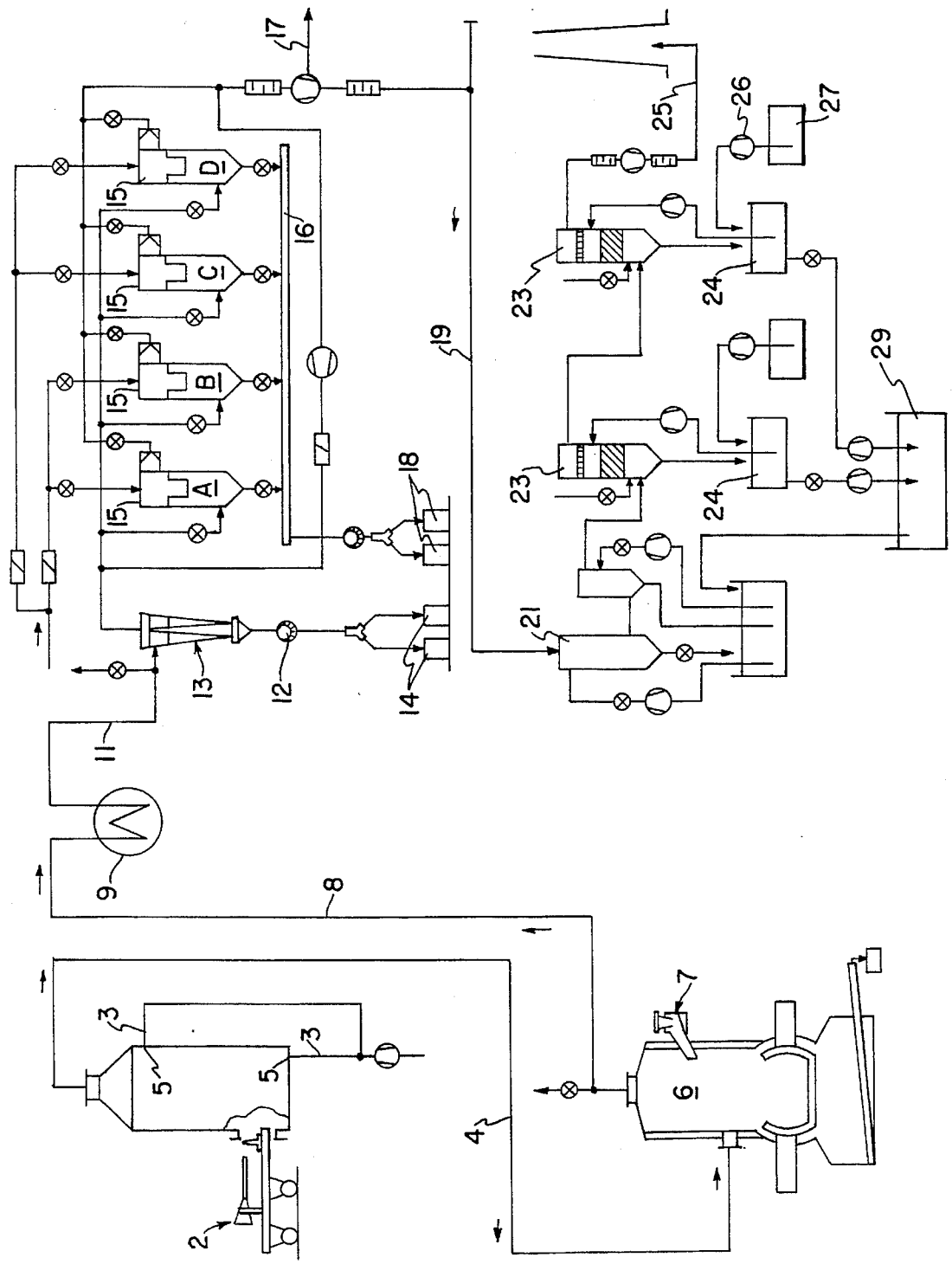

PROCESS FOR DESTROYING PYROTECHNIC MATERIAL

The invention relates to a process for working up pyrotechnical material and an apparatus suitable for this purpose.

Pyrotechnical munitions, such as illumination elements, flares, propellant charges, for example for rockets, which are no longer suitable for use owing to the expiry of their shelf life, must be disposed of. Owing to the pyrotechnical potential and the high strength of the active material, safe mechanical separation of the active materials is impossible or is possible only at a disproportionately high expense.

Illumination elements consist, as a rule, of a container, which is usually made of metal, preferably of aluminium, a fuse and the active material. The active material is composed of a light metal powder as an energy source, an oxidising agent which can eliminate the need for oxygen, an organic binder for mechanical strengthening of the mixture and optionally colour intensifiers. As a rule, magnesium is used as the light metal powder since other suitable metals are either toxicologically unsafe or too expensive. As a rule, nitrates, in particular sodium nitrate, are used as oxidising agents, chlorates or perchlorates also being used in exceptional cases. Polymers are used as organic binders. Halogen-containing compounds, in particular fluorine-containing or chlorine-containing metal salts, are present as colour intensifiers. When the illumination elements burn, predominantly metal oxides, such as magnesium oxide, sodium oxide and aluminium oxide, nitrogen and oxides of nitrogen and carbon oxides and optionally hydrogen halide are therefore formed.

The active materials of projectiles which are intended to release irritants contain a high proportion of chlorinated hydrocarbons in addition to aluminium or zinc in powder form or as grit and irritation-promoting additives. Propellant charge powders develop a high proportion of oxides of nitrogen when they undergo combustion.

The disposal of this pyrotechnical material therefore presents problems owing to the high proportion of environmental pollutants, such as oxides of nitrogen and halohydrocarbons, which are formed during the combustion and must not escape into the environment. The working up of such a material and the separation of the pollutants is, as a rule, very expensive.

DE-B 41 06 615 discloses a process for working up smoke elements or smoke active materials containing chlorinated hydrocarbons. These active materials are processed in such a way that the zinc and aluminium compounds present therein can be recovered and reused. This process relates to special working up steps for the chlorinated hydrocarbons present in the active materials. Furthermore, DE-A 40 37 919 discloses a process for the disposal of propellant charges from munitions, in which the propellant charges are comminuted with the addition of water and then burned using a special fluidised-bed furnace.

It is the object of the invention to provide a process for the disposal of pyrotechnical material, which can be carried out safely, in which no harmful substances are released into the environment and in which the cost of removal of the harmful substances can be minimised.

This object is achieved by a process for working up pyrotechnical material, which is characterised in that I. a pyrotechnical material A, where predominantly alkaline reaction products are formed, and a pyrotechnical material B, where predominantly acidic reaction products are formed, are subjected to controlled combustion, II. the combined crude gases formed during the combustion are cooled to a temperature below 400° C., III. the combined crude gases are purified under dry conditions by first feeding them into a preliminary separator, coarse particles being separated off, and then feeding them via fine dust filters in order to separate off finely divided solids, and/or IV. the combined crude gases are purified under wet conditions by first passing them through a rotary scrubber and feeding them via one or more absorption unit(s), and V. the pure gas is released as waste air.

With the process according to the invention, it is possible to reduce to a very small level the harmful components, such as oxides of nitrogen and halogen compounds, which are formed during the combustion of the pyrotechnical material and to minimise the cost of the gas purification. In addition, reusable substances are obtained and the heat generated during the combustion can be effectively used. For the purposes of the invention, pyrotechnical material is understood as meaning pyrotechnical articles or pyrotechnical charges.

In the first stage of the process according to the invention, pyrotechnical material A, where predominantly alkaline reaction products are formed, and pyrotechnical material B, where predominantly acidic reaction products are formed, are subjected to controlled combustion. The combustion can be carried out continuously or batchwise, in the continuous procedure the material supplied preferably being ignited in each case by the material already present in the reactor, while in the batchwise process one batch is always burned and thereafter the next batch is fed in and ignited. The throughput and residence time of the material are dependent on the material to be burned, the type of process and the reactor used. In general, the residence time is in the range from 10 seconds to 1 minute.

According to the invention, two variants are provided for the combustion of the pyrotechnical material. In a first variant, pyrotechnical material A and pyrotechnical B are burned separately in two reactors and the crude gases are then combined by, for example, feeding the crude gas formed during the combustion of the pyrotechnical material A into the reactor in which the pyrotechnical material B is burned. In a second variant, pyrotechnical material A and pyrotechnical material B in a suitable ratio are burned simultaneously in one reactor. An essential feature of the invention is that predominantly alkaline reaction products are formed during the combustion of the pyrotechnical material A whereas predominantly acidic reaction products are formed during the combustion of the pyrotechnical material B. For example, flare active materials, illumination elements and thermite-like mixtures are used as pyrotechnical material A. For example, propellant charge powders, smoke and irritant active materials and coloured smokes may be mentioned as pyrotechnical material B. The alkaline products formed during the combustion of the pyrotechnical material A are predominantly alkali metal and alkaline earth metal oxides, while the acidic reaction products formed during combustion of the pyrotechnical material B are, as a rule, halogen compounds and oxides of nitrogen.

The combustion of the pyrotechnical material is carried out in one or two combustion chambers. Any reactor which can withstand the high temperatures generated during the combustion and can be loaded in a suitable manner may be used as a combustion chamber. Either, a tube reactor and/or a reactor having a brick lining, for example a trough reactor or rotary kiln, is preferably used. A vertically arranged apparatus which consists of highly heat-resistant steel and is cooled internally with gas is preferably used as a tube reactor. For this purpose, air is introduced via tangential nozzles and is passed over tangential plates so that it flows along the wall of the tube reactor and thus cools the steel jacket. This ensures that the tube jacket reaches no more than 400° C., which it withstands without damage. By means of the air control, the high-temperature zone is limited in a defined manner to a certain region. This ensures on the one hand that organic pollutants are virtually completely degraded directly on formation by the combustion of the pyrotechnical elements and, on the other hand, that caking of material or abrasion at the internal wall is prevented.

The reactor having a brick lining comprises a closed pressure-tight space which is lined on the inside with refractory material. Since the refractory material withstands temperatures of from above 1500° to 2000° C., it need not be cooled. In a preferred embodiment of the reactor having a brick lining, for example in the form of a trough reactor, a mobile trough which receives melting material and falling slag and can be emptied batchwise is provided below the combustion chamber.

A tube reactor is preferably used for working up pyrotechnical material A, whereas a reactor having a brick lining is used for working up pyrotechnical material B.

After the controlled combustion of pyrotechnical material A and B, the crude gases formed are optionally combined, if the combustion was carried out in separate reactors, by passing the crude gas formed during combustion of one type of pyrotechnical material into the other reactor. The crude gas formed in each case during the combustion, or the combined crude gases, is or are passed through a high-temperature region in which they are kept at a temperature of at least 1200° C., preferably up to 1500° C., over a predetermined period in order to decompose any organic substances still present. If the crude gas has a temperature of more than 1200° C. as a result of the combustion, it is sufficient to keep the crude gas in the reaction region over the predetermined period without additional heating. This is effected in one embodiment, for example, by ensuring that the reactor has a sufficient height so that the residence time of the ascending crude gas is adequate for complete reaction in the high-temperature region. In another embodiment, in which the air is blown in tangentially, the crude gas (reaction gas) is passed spirally upwards and thus remains for a sufficiently long time in the high-temperature region. If the crude gas is not sufficiently hot, an external heating source is provided in order to heat the crude gas to the desired temperature. The period of subsequent heating depends on the proportion of organic compounds and can be readily determined by one skilled in the art. As a rule, a period of 2 to 10 seconds is sufficient. In order to decompose the organic compounds, a temperature of at least 1200° C., preferably at least 1500° C., is required.

The combined crude gases which leave the high-temperature region contain virtually only inorganic compounds, which are partly gaseous and partly in the form of very small particles. Depending on the composition of the crude gas, dry purification and/or wet purification are carried out. The wet purification can be carried out before or after the dry purification. Preferably, the crude gas is first purified under dry conditions and then optionally subjected to wet purification, depending on requirements. Since the gas which emerges from the high-temperature region has a very high temperature, it is cooled to a temperature of below 400° C., it being possible at the same time to utilise the heat. In various applications, cold air can be mixed with the hot gas for cooling in the course of the process. In addition, heat may be utilised by using known heat recovery techniques. An example of this is the connection to the heat circulation of a heating station. The crude gas is cooled to temperatures below 400° C. or preferably below 200° C., depending on the subsequent treatment.

After this cooling stage, the crude gas is subjected to dry and/or wet purification. As a rule, a dry purification is carried out since the compounds formed by reaction of the components of the combined crude gases are present in finely divided form. Where the gas contains a high proportion of gaseous impurities, the cooling can be followed directly by the wet purification. However, this variant is less preferable. In the preferred embodiment, the gas is passed to a dry purification stage. In this zone in which the gas cools further, the compounds present in the crude gas react with one another. The alkaline compounds, in particular alkali metal and alkaline earth metal oxides, and the acidic compounds, in particular oxides of nitrogen, chlorides, fluorides and oxides of sulphur ($SO_2$, $SO_3$), can react to give salts, which can then be readily separated off under dry conditions. Thus, nitrate and especially nitrite salts are formed from the gaseous oxides of nitrogen, while the gaseous chlorides and fluorides are converted into chloride and fluoride salts, respectively. Dry purification of the crude gas is therefore preferably carried out first, having the advantage that no wash waters which have to be worked up are produced and that the resulting solids can be directly reused.

For the dry separation, the crude gas is first fed into a preliminary separator in which coarse particles are separated off. Coarse particles are designated as particles which have a size of at least 10 μm. The coarse particles can be separated off in a manner known per se. A multicyclone is preferably used for the separation. The type of particles separated off in the multicyclone is dependent on the pyrotechnical material worked up.

The crude gas which has been freed from the coarse particles and has been sufficiently cooled by the pretreatment is then fed via a fine dust filter in order to separate off small solid particles, i.e. particles having a diameter of less than 10 μm. Woven fabric filters are preferably used as fine dust filters. In a preferred embodiment, a system comprising several filters is used, a part of the filters being loaded simultaneously and the other part of the filters being cleaned to remove the deposited solid mixture. By means of the fine dust filters, the crude gas is purified to a solids content of $\leq 10$ mg/m$^3$. Depending on the composition of the pyrotechnical material A and B, after the fine separation the gas can be purified to such an extent that the proportions of particulate material and gaseous compounds are below the emission limits. It can then be released directly as waste air. If the gas still contains gaseous impurities, in particular halogen-containing compounds or oxides of nitrogen, it is subjected to a wet purification after the dry purification. As a rule, however, wet purification is no longer necessary if the material to be burned is suitably chosen.

For the wet purification, the gas emerging from the fine separator or optionally from the heat exchanger is passed into a scrubbing apparatus for scrubbing the crude gas. Apparatuses of this type are known to those skilled in the art. For scrubbing, the crude gas, which was preferably cooled to a temperature below 140° C., is preferably first fed through a Venturi unit in order to cool the gas to such an extent that its temperature is below the boiling point of water. Thereafter, it is passed into a rotary scrubber. After the rotary scrubbing unit, the further gas scrubbing is carried out in a known manner using one or more absorption units.

Packed or tray columns which are charged with suitable wash liquids, depending on the loading of the gas, are preferably used for this purpose. In addition, further filter units which are equipped, for example, with catalysts or carbon absorption filters may be used. The very pure gas emerging from the absorption unit or units is discharged as waste air.

In order to ensure that, during the entire process, no crude gas which has not been completely purified can escape into the environment, the entire plant is operated under reduced pressure. This is effected in a manner known per se, for example by using an extraction fan.

The process according to the invention can be adjusted in a variable manner to the conditions which prevail during the combustion of different pyrotechnical materials. To carry out the process as effectively as possible, the type and amount of the pyrotechnical materials A and B are chosen so that as high a proportion as possible of the substances escaping in the crude gas react with one another to give salts, which are deposited under dry conditions. Thus, for example, it is advantageous to burn propellant charge powders which give 10 to 50% of oxides of nitrogen (based on nitro groups present) during the combustion with illumination active materials which form a high proportion of magnesium oxide, it being possible to reduce the proportion of oxides of nitrogen in the crude gas to the range of 10 to 100 ppm after the dry separation. It is also preferable to burn smoke or irritant materials which have a high content of organic halogen compounds with illumination active materials or thermite-like mixtures which contain magnesium. The ratios are chosen in each case so that complete binding of the hydrogen halides by alkali metal and alkaline earth metal elements is achieved.

When only one type of pyrotechnical material is available for disposal, a second additional component which replaces the other group of materials can be simultaneously burned. If, for example, only pyrotechnical material A is present, ammonia or amines for binding nitrite and nitrate salts can be added to this material during the combustion as a replacement for pyrotechnical material B. If, on the other hand, only pyrotechnical material B has to be disposed of, magnesium, aluminium or iron powder can be added as pyrotechnical material A during the combustion, in order once again to promote salt formation.

The invention furthermore relates to an apparatus for working up pyrotechnical material, which is characterised by (A) one or more reactors for the controlled combustion of pyrotechnical material; (B) a heat exchanger unit for cooling the crude gas to a temperature of below 400° C.; (C) a preliminary separator for separating off coarse particles; (D) one or more fine dust filters.

The apparatus according to the invention may optionally also comprise (E) a scrubbing apparatus for scrubbing the crude gas and (F) one or more absorption unit(s).

The apparatus according to the invention is suitable for working up various types of pyrotechnical material, such as, for example, flares and illumination pyrotechnics, propellant charges, rocket propellant charges, smoke active materials, coloured smoke and irritants.

The apparatus according to the invention is now described in detail with reference to the figure.

FIG. 1 shows an apparatus according to the invention, in which the controlled combustion of pyrotechnical material A and pyrotechnical material B is carried out in two separate reactors. Pyrotechnical material where predominantly alkaline reaction products are formed is fed by means of feed apparatus 2 to the tube reactor 1 and is subjected to controlled combustion. The tube reactor 1 is a reactor comprising heat-resistant steel without an internal lining. Fresh air is fed to the tube reactor 1 via a pipe 3 via tangential nozzles 5. The pyrotechnical material where predominantly acidic reaction products are formed is fed to the trough reactor 6 via the loading hopper 7 and is subjected to controlled combustion. The crude gas formed during the combustion in the tube reactor 1 is passed via pipe 4 to the trough reactor 6. The crude gases mix with one another in a high-temperature zone formed in the trough reactor 6 and are kept at above 1200° C. for at least two seconds and fed via pipe 8 together into the heat exchanger unit 9. The hot gas heats water which is fed into the heat exchanger and which can be passed into the hot water or heating circulation of a heating station or for internal heat utilisation. The gas leaves the heat exchanger unit 9 via the pipe 11, pipe 11 having dimensions such that the gas covers a sufficient distance to permit a reaction of the alkaline and acidic compounds. The gas is fed via pipe 11 into a multicyclone 13, where coarse particles are separated off. The coarse particles are removed batchwise via the cellular wheel sluice 12 and collected in storage containers 14. From the multicyclone, the gas is passed into fine dust filters 15 (A, B, C, D), where fine dust particles are separated off. The fine dust filters are cleaned from time to time by blowing compressed air onto them, the fine dust being fed via the discharge screw 16 into storage container 18 and being collected there. After leaving the fine dust filters 15, the gas can either be released into the environment via pipe 17 if it is sufficiently pure or fed to a wet purification stage, in which case it is fed via pipe 19 into a rotary scrubbing unit 21. After the rotary scrubbing, it is passed through one or more absorption unit(s) (23) which are provided with suitable wash vessels 24, after which the gas has such a low content of impurities that it can be released into the environment via pipe 25. For disposal, a neutralising solution is pumped from the neutralisation vessel 27 via the pump 26 into the liquid present in the wash vessels, and the neutralised solution is then discharged into the buffer tank 29.

According to the invention, a process and an apparatus are provided in order to work up various types of pyrotechnical material safely, with the least possible expense and without pollution of the environment, valuable material and energy being recovered at the same time.

The invention is illustrated by the following examples:

Example 1

In a reaction chamber, propellant charges were first reacted at a flow rate of 100 kg/h. The propellant charges were burned with excess air at a temperature of about 800° C. without additional heating. Of the 13.7 kg/h of nitrogen introduced as part of the propellant charges, 5% was converted to $NO_2$. The waste gas contained 6294 mg/m$^3$ (S.T.P.) of $NO_2$, based on a waste gas containing 11% of oxygen. In a second reaction, 50 kg/h of propellant charge were disposed of together with 100 kg of active material of the signal salt of the green hand flare. Although the introduction of nitrogen in the mixture to be disposed off was reduced only from 13.7 kg/h to 11.16 kg/h, on the other hand the output of oxides of nitrogen decreased from 6294 mg/m$^3$ (S.T.P.) to 200 mg/m$^3$ (S.T.P.) (98 ppm by volume).

As a result of the reducing effect of the active materials reacted, the NO content of the waste gas initially decreased as a result of the increasing reaction temperature. On further cooling of the gas, formation of nitrates and especially of nitrites took place on the way from the heat exchanger to the coarse filter, the said nitrates and nitrites in turn reacting with alkaline earth metal compounds present in the gas to form alkaline earth metal nitrates and nitrites.

Example 2

The propellant charge flow rate used in Example 1 (about 50 kg/h) was reacted in a reaction chamber together with a combustion salt which consisted of 52% of magnesium powder and 48% of $NaNO_3$.

The thermite-like mixture reached temperatures of more than 2000° C. during its reaction and simultaneously led to increased reduction of the $NO_x$ groups formed during the combustion of the propellant charges. As a result of the reaction temperature being higher than in Example 1, it was possible further to reduce the $NO_x$ content in the gas.

Example 3

Irritant elements which contained 64% of hexachlorocyclohexane, 34% of aluminium, 1.25% of liquid paraffin and 0.75% of chloroazetophenone were reacted together with combustion salt for flares, which salt contained 75% of $KNO_3$, 15% of magnesium and 10% of iditol. 50 kg of the irritant active material contained 23.5 kg of chlorine. The chlorine of the irritant reacted during the oxidative process in primary and secondary reaction steps with formation of potassium chloride and magnesium chloride in addition to aluminium chloride.

Without the addition of further chemical potentials, it was possible, by pairing the two substances to be disposed of, to reduce the HCl content of the waste gas to $\leq 5$ mg/m³ (S.T.P.), based on the pure gas.

Example 4

75 kg/h of propellant charge were burned with 50 kg of fuel oil in a separate reaction chamber 1. The resulting crude gases reached a temperature of more than 1200° C. 10% of the nitrogen present in the propellant charge were converted to $NO_x$. The resulting crude gas flow, which contained 2009 m³ (S.T.P.)/h, corresponding to 2050 mg/m³ (S.T.P.) of $NO_x$, was fed completely or partly to a reaction chamber 2 in which propellant charges according to Claim 1 were reacted. The $NO_x$ fed in with the crude gas was further reduced analogously to the reaction of Example 1 by the reducing and catalytic effect of the pyrotechnical propellant charges and combined in the remaining part with the oxidic dusts to give a content of nitrites which was effective for the process gas purification. By splitting the process gas stream fed into the reaction chamber 2, it was possible to control the process gas stream from reaction chamber 2 in such a way that the $NO_x$ values of the resulting pure gas corresponded to the standards <200 mg/m³ (S.T.P.) with 11% of $O_2$ in the waste gas.

Example 5

Propellant charges were burned continuously in a reaction chamber with the addition of combustion air, supported by an oil or gas burner. At the same time, powdered reaction products of the disposed pyrotechnical active materials which contained potassium oxide, magnesium oxide, barium oxide, etc., were introduced into the reaction zone. These reactive dusts were thoroughly mixed with the crude gas and discharged via an after-combustion chamber. The dusts further increased formation of $N_2$ from the nitro groups of the propellant charges and, during the subsequent removal of dust from the gas at temperatures below 200° C., again led to the formation of nitrites/nitrates and thus to the reduction of the $NO_x$ content of the process gas.

We claim:

1. A process for destroying pyrotechnical material comprising pyrotechnical material A which forms predominantly alkaline reaction products and pyrotechnic material B which forms predominantly acidic reaction products comprising the steps of:
   I. subjecting pyrotechnic material A and pyrotechnical material B to combustion to produce crude gases;
   II. cooling the combined crude gases to below 400° C.;
   III. purifying the combined crude gases by at least one of the following means:
      A. under dry conditions by feeding such gases first into a preliminary separator to separate coarse particles, and then through fine dust filters to separate finely divided solids; and
      B. under wet conditions by passing the crude gases first through a rotary scrubber and then through one or more absorption units; and
   IV. releasing the purified gas.

2. A process according to claim 1, wherein the pyrotechnic material A is a flare, an illumination pyrotechnics, a thermite charge, or any mixture thereof.

3. A process according to claim 1, wherein the pyrotechnical material B is a propellant charge, tear gas, a colored smoke, or any mixture thereof.

4. A process according to claim 1, wherein the pyrotechnic material A and the pyrotechnical material B are burned separately and the crude gases are then combined before cooling according to step II.

5. A process according to claim 4, wherein the pyrotechnic material A is burned in a tube reactor to which air is fed via tangential nozzles and is passed over tangential plates, and the pyrotechnic material B is burned in a trough reactor or rotary kiln which is lined with refractory material.

6. A process according to claim 1, wherein pyrotechnic material A and pyrotechnical material B are burned simultaneously in one reactor.

7. A process according to claim 1, maintained at subatmospheric pressure.

8. A process according to claim 1, wherein, in step I, the crude gas is heated to at least 1200° C.

9. A process according to claim 1 wherein, in step II, the crude gas for the dry purification is cooled to a temperature below 200° C.

10. A process according to claim 1, wherein, in step IIIA, a multicyclone is used as the preliminary separator.

11. A process according to claim 1, wherein, in step IIIB, the crude gas which is fed directly to the wet purification is cooled to a temperature below 140° C.

12. A process according to claim 1, wherein, in step IIIB, a venturi scrubber is located upstream of the rotary scrubber.

13. A process according to claim 1, wherein, in step IIIB, packed columns or tray columns are used as the absorption unit.

14. A process for destroying pyrotechnic material comprising pyrotechnic material B which forms predominantly acidic reaction products and a second material which is magnesium, aluminum or iron powder comprising the steps of:
   I. subjecting pyrotechnic material B and the second material to combustion to produce crude gases;
   II. cooling the combined crude gases to below 400° C.;
   III. purifying the combined crude gases by at least one of the following means:
- A. under dry conditions by feeding such gases first into a preliminary separator to separate coarse particles, and then through fine dust filters to separate finely divided solids; and
- B. under wet conditions by passing the crude gases first through a rotary scrubber and then through one or more absorption units; and IV. releasing the purified gas.

15. A process for destroying pyrotechnic material comprising pyrotechnic material A which forms predominantly alkaline reaction products and a second material which is ammonia or an amine comprising the steps of:

I. subjecting pyrotechnic material A and the second material to combustion to produce crude gases;

II. cooling the combined crude gases to below 400° C.;

III. purifying the combined crude gases by at least one of the following means:
- A. under dry conditions by feeding such gases first into a preliminary separator to separate coarse particles, and then through fine dust filters to separate finely divided solids; and
- B. under wet conditions by passing the crude gases first through a rotary scrubber and then through one or more absorption units; and IV. releasing the purified gas.

* * * * *

UNITED STATES PATENT AND TRADEMARK OFFICE
CERTIFICATE OF CORRECTION

PATENT NO. : 5,463,169
DATED : October 31, 1995
INVENTOR(S) : Heinz Hebisch et al.

It is certified that error appears in the above-identified patent and that said Letters Patent is hereby corrected as shown below:

Column 5, line 62, delete "figure 1" and substitute --the figure--.

Signed and Sealed this

Eighth Day of June, 1999

*Attest:*

Q. TODD DICKINSON

*Attesting Officer*    *Acting Commissioner of Patents and Trademarks*